G. R. CLARK & F. LOTHROP.
Iron-Fence.
No. 206,538. Patented July 30, 1878.
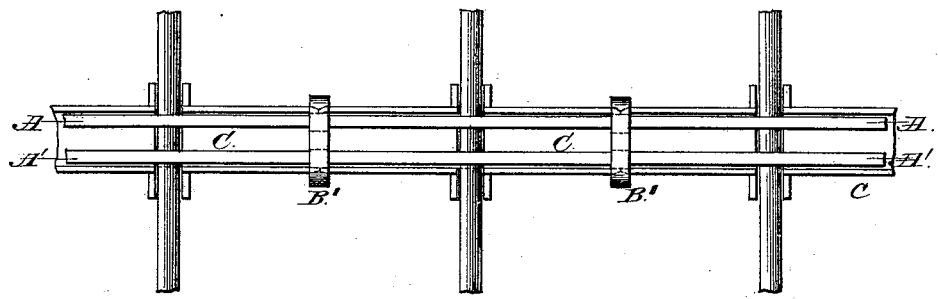
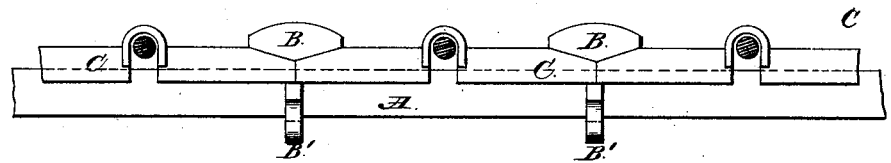
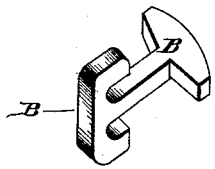
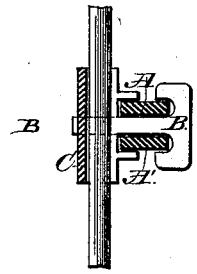
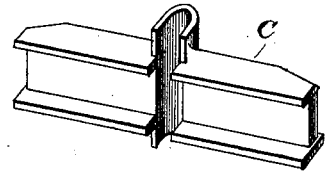
Witnesses:
M. H. Beach
C. J. Walsh
Inventors:
George R. Clark
Frank Lothrop

UNITED STATES PATENT OFFICE.

GEORGE R. CLARK AND FRANK LOTHROP, OF DUBUQUE, IOWA.

IMPROVEMENT IN IRON FENCES.

Specification forming part of Letters Patent No. 206,538, dated July 30, 1878; application filed May 3, 1878.

*To all whom it may concern:*

Be it known that we, GEORGE R. CLARK and FRANK LOTHROP, both of city and county of Dubuque, and State of Iowa, have invented a new and useful Improvement in Fence-Posts and Fences; and do hereby declare that the following is a full, clear, and exact description thereof, reference being had to the accompanying drawings, making part of this specification.

Figure 1 represents a side view of a portion of our improved fence. Fig. 2 represents a view at right angles to that shown in Fig. 1. Figs. 3, 4, and 5 represent views in detail.

The same letter indicates the same part whenever it occurs.

The rail is composed of two bars, A A', held together by a double clamp, B B', the arms of which are at right angles with each other. The stem being placed between the rails, the ends of one arm are received or bent substantially as shown, so that the rail may, if desired, fit into the slots thus formed between the ends of this arm and the stem or standard of the clamp B B'. The line of the inner side of the other arm of the clamp B B' makes a slightly obtuse angle with the line of the stem, so as to receive the wedge-shaped ends of the sliding section C. This sliding section C is wedge-shaped at both ends, is made so as to fit over the rails, and through it the picket is inserted, and all parts are firmly secured in their proper positions by the wedge-shaped ends passing under the ends of the arm B of the clamp B B'. These sliding sections may be ornamented in any manner desired, and when secured are continuous.

The fence may, if desired, be constructed by inserting the pickets in pairs in the places between the ends of the arm B and the stem of the clamp B B', by placing said arm B horizontally instead of vertically, as when the picket is passed through the sliding section C, and in this case the parts are secured by the wedge-shaped ends of the sliding sections passing under the other arm of the clamp.

This clamp may also be used for fastening ornaments to the fence.

This invention is intended to be more especially applicable to iron fences, but may be applied to those made of other material.

One advantage possessed by the use of this invention is, that the iron used for rails and pickets need not be such as is specially manufactured for the purpose, but such as may be found in the market, whereby the cost is greatly lessened.

What we claim is—

1. The clamp B B', substantially as and for the purpose set forth.

2. In combination, the rails A A', the clamp B B', and the sliding section C, substantially as and for the purpose set forth.

GEORGE R. CLARK.
FRANK LOTHROP.

Witnesses:
M. H. BEACH,
C. J. WALSH.